United States Patent
Droz et al.

(10) Patent No.: US 7,020,153 B2
(45) Date of Patent: Mar. 28, 2006

(54) METHOD AND SYSTEM FOR PROCESSING DATA PACKETS

(75) Inventors: Patrick Droz, Rueschlikon (CH); Lukas Kencl, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 09/898,870

(22) Filed: Jul. 3, 2001

(65) Prior Publication Data

US 2002/0136202 A1    Sep. 26, 2002

(30) Foreign Application Priority Data

Jul. 3, 2000    (EP) .................................. 00114246

(51) Int. Cl.
*H04L 12/54* (2006.01)
(52) U.S. Cl. ...................................... 370/428; 370/392
(58) Field of Classification Search ................ 370/389, 370/390, 392, 419, 412, 413, 298, 428

See application file for complete search history.

(56) References Cited

U.S. PATENT DOCUMENTS

| | | | | |
|---|---|---|---|---|
| 6,002,688 A | * | 12/1999 | Song ........................ 370/395.3 |
| 6,477,167 B1 | * | 11/2002 | Wu ......................... 370/395.21 |
| 6,625,121 B1 | * | 9/2003 | Lau et al. .................... 370/230 |
| 6,661,788 B1 | * | 12/2003 | Angle et al. ................. 370/390 |
| 6,810,031 B1 | * | 10/2004 | Hegde et al. ................ 370/351 |

* cited by examiner

*Primary Examiner*—Duc Ho
*Assistant Examiner*—Thien D. Tran
(74) *Attorney, Agent, or Firm*—Douglas W. Cameron; Anne Vachon Dougherty

(57) ABSTRACT

The present invention provides an improved method and a system for processing data packets in a router. The router includes a plurality of input/output ports and more than one packet processing units. The packet processing units derive from a piece of information associated to each data packet one output port to forward the data packet to. In response to a data packet arriving at one input port one packet processing unit is determined. The determined packet processing unit is then requested to derive a respective output port. The output port is derived from a piece of information within the packet. An identification identifying the respective output port is in the following returned to the requesting unit. Finally, the data packet is forwarded to the identified output port. The method and system according to the present invention optimize advantageously resource utilization that leads to higher packet processing speed and helps to lower the costs and power requirements. Furthermore, it leads to increased fault tolerance, i.e. increased reliability.

11 Claims, 2 Drawing Sheets

METHOD AND SYSTEM FOR PROCESSING DATA PACKETS

BACKGROUND OF THE INVENTION

1. Field of the Invention

The present invention relates generally to a method and system for processing data packets in switched communications networks and in particular to a method and a system for forwarding data packets in a router.

2. Description of the Prior Art

A switched communications network transfers data from source to destination through a series of network nodes. Switching can be done in one of two ways. In a circuit-switched network, a dedicated connection is established through the network and is held for as long as communication is necessary. An example of this type of network is the traditional telephone system.

A packet-switched network, on the other hand, routes data in small pieces called packets, each of which proceeds independently through the network. In a process called store-and-forward, each packet is temporarily stored at each intermediate node, then forwarded when the next link becomes available. In a connection-oriented transmission scheme, each packet takes the same route through the network, and thus all packets usually arrive at the destination in the order in which they were sent. Conversely, each packet may take a different path through the network in a connectionless or datagram scheme. Since datagrams may not arrive at the destination in the order in which they were sent, they are numbered so that the destination user can reorder them properly. Ideally, a network experiences no mutual interference between links, a standard that implies that several links can simultaneously carry packets between their respective transmitting and receiving nodes.

In the last decade the amount of data packet traffic being communicated over communication networks has grown exponentially. This applies especially to the Internet that is a well-known member of connectionless packet-switched networks. In some environments the data packet traffic has reached such an enormous amount that conventional routers reach their limit. Since the performance of a router is crucial to the number of packets that can be transmitted through a communication network or from one communication network to another, a slow router can cause a backlog of data packets. Hence, the data packets need more time to reach their destination.

A data packet is routed through the network primarily according to its destination address. In order to determine the correct subsequent network the router has to convert the destination address of a data packet into a corresponding next hop physical address (i.e. the outgoing port of a router). This task is called "address resolution" and is carried out as a part of the more complex "packet processing" task. The destination address is stored in a packet header. The packet header is a portion of a packet that is preceding the actual data, containing source and destination addresses, error checking and other fields.

Packet processing, in addition, includes carrying out tasks like classification, filtering or load balancing, which may, based on multiple fields contained in the packet (not only the destination address), further influence the "address resolution" and the entire treatment and alterations applied to the packet in a router. For example, decide on specific QoS (Quality of Service) treatment of the packet, its mapping onto an MPLS (Multiprotocol Label Switching) label, discarding it or sending it to a control point in case of filtering or splicing with another TCP (Transmission Control Protocol) connection in case of load balancing.

Packet processing is a resource intensive procedure that requires fast processors and instant memory access. In order to speed up performance of the packet processing more than one packet processing unit is normally provided within a router. Two different approaches have been followed in the architecture of routers to comply with the aforementioned requirements.

In a distributed router architecture, the packet processing is performed in a processing device located directly at each input port. After the conversion of the packet's destination address into a physical address the packet is forwarded towards the determined physical address, i.e., a corresponding output port. Although packets at different input ports can be processed simultaneously, the whole computing capability of all packet processing units might actually not be utilized in real live situations, since the incoming traffic load is hardly ever evenly distributed over all input ports or it does not always reach the line rate.

A parallel router architecture seeks to overcome this drawback. In the parallel router architecture a pool of packet processing units is accessible through a pool interconnect connecting all packet processing units and providing a link to the input ports. Through the pool interconnect the input ports have access to the pool of packet processing units that can process multiple packets concurrently. Thus, every packet from each input is submitted for processing to the pool of parallel packet processing units. That is, for each incoming packet a request for packet processing is sent to the pool of parallel packet processing units. After the packet is processed the respective information is sent back to the originating input port, from where the packet gets forwarded to determined output port. In the parallel router architecture, a bottleneck or a single point of failure for the whole device might become the pool interconnect or a load balancing device of the pool.

SUMMARY OF THE INVENTION

It is therefore an object of the present invention to provide an improved method and system for processing data packets. The foregoing object is achieved as it is now described.

A method and a system are provided for processing data packets in a router. The router includes a plurality of input ports, a plurality of output ports and more than one packet processing units. The packet processing units derive from a piece of information associated to each data packet one of said plurality of output ports to forward the data packet to. In response to a data packet arriving at one of the input ports one packet processing unit of said multiple packet processing units is determined. The determined packet processing unit is than requested to derive a respective output port to forward the data packet to, whereby the respective output port is derived from a piece of information associated to the data packet. In the following, an identification identifying the respective output port is returned to the requesting unit. In addition, other information about the desired packet treatment and packet alterations, based on the packet processing, may also be sent back to the requesting unit. Finally, the desired treatment and alterations are applied to the data packet and the data packet is forwarded to the identified output port.

In a preferred embodiment of the method and system according to the present invention determining one packet processing unit is based on a split of an identifier vector space, where an identifier vector consists of a selected set of fields within the packet and the identifier vector space is formed by the complete range of possible values of said selected fields of said data packets.

The method and system according to the present invention optimize advantageously resource utilization. Furthermore, it leads to higher packet processing speed and helps to lower the costs and power requirements. Another advantage of the provided method and system is that it can cope with asymmetrical traffic load and additionally provides optimized load balancing. Furthermore, the method and system in accordance with the present invention avoid single points of failure and therefore provide fault tolerance.

The above, as well as additional objectives, features and advantages of the present invention, will become apparent in the following detailed written description.

BRIEF DESCRIPTION OF THE DRAWINGS

The above, as well as additional objectives, features and advantages of the present invention, will be apparent in the following detailed written description.

The novel features of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
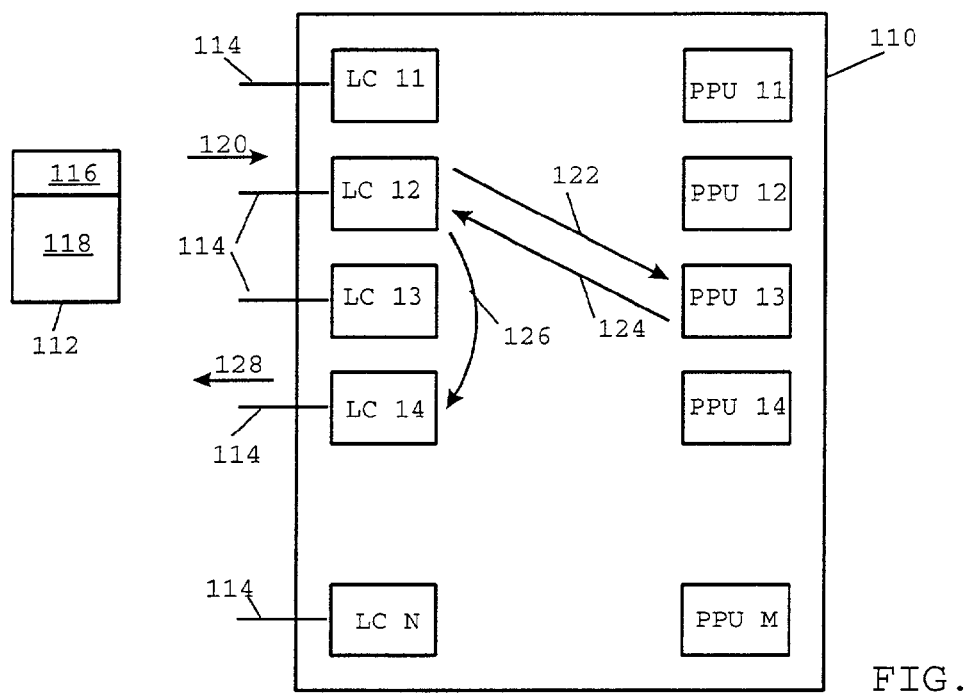
FIG. 1 is a high-level block diagram illustrating a packet processing scheme in a router being implemented in accordance with the present invention.

With reference now to the figures and, in particular, with reference to FIG. 1, there is depicted a high-level block diagram illustrating a packet processing scheme in a router 110 being implemented in accordance with the present invention. The router 110 includes N input/output line cards LC 11 to LC N, wherein N is an integer number greater than one. The router 110 further includes M packet processing units PPU 11 to PPU M, wherein M is as well an integer number greater than one. Preferably, by far more than two line cards LC 11 to LC N and packet processing units PPU 11 to PPU M are provided within a router.

The line cards LC 11 to LC N function as an interface between a transmission facility (not shown) and a switching unit (not shown). The transmission facility forms a network through which a data packet 112 is being sent. Whereas, the switching unit transports the data packet 119 to the particular outbound line card from which it leaves the router 110. Each line card LC 11 to LC N comprises an input/output port 114 which at the same time form the input ports and output ports of tho entire router 110.

The packet processing units PPU 11 to PPU M determine for a given piece of information included in each data packet 112 an outbound line card to which a particular data packet needs to get forwarded to as well as desired treatment and alterations to be applied to the packet. For example, the packet processing units PPU 11 to PPU M convert a given destination address into a corresponding next hop physical address. This is normally performed by using a routing table containing information needed for the conversion.

The data packet 112 consists of a header portion 116 and a data portion 118. The header portion 116, or short the header 116, contains besides other information the destination address of the respective data packet 112. More detailed information about the packet is carried, for example, in the flow ID, a 5-tuple consisting of a protocol number, source and destination port and source and destination address. Whereby, the destination address is, in fact, an element of the flow ID.

The data portion 118 is formed by the data being transmitted. It is also called "payload".

Let's assume that the data packet 112 appears at the router 110 at input port 114 of line card LC 12 as indicated with arrow 120. At first, the packet 112 is parsed to extract the relevant packet fields (like, for example, the destination address). At the same time, the data packet 112 is stored until it can be forwarded.

Then, the line card LC 12 determines one of the packet processing units PPU 11 to PPU M. There are different possibilities for determining one of the packet processing units PPU 11 to PPU M according to the present invention.

In general, the computation for determining the correct processing unit takes as an input any set of fields included in the packet . Such a set of fields is referred to as an "identifier vector". For example, the identifier vector can be the flow ID (a vector consisting of five fields) or the destination address (one-dimensional vector), or any other combination of fields or parts of fields as well. When the format of the identifier vector is defined, it forms an identifier vector space, i.e., all possible values of the vector. So, for example, in case of a vector consisting merely of the destination address, the vector space would be the address space.

In case it is preferred to preserve flows, i.e. packets having the same flow ID be mapped to the same processing unit, only such fields might be used in the identifier vector that do not change within one flow.

In case the processing units perform the longest prefix match lookup on some field, it may be preferable to define only the prefix part of the relevant field as the identifier vector. That way, prefix-defined chunks of the field range would be mapped to the same processing unit and the processing unit may be able to exploit the created traffic locality to speed up the longest prefix match lookup.

Preferably, the packet processing unit PPU 11 to PPU M is determined by computing over the identifier vector. That is, the computation is performed in such a way that to each packet processing unit PPU 11 to PPU M only packets containing identifier vectors belonging to a certain subspace of the identifier vector space are assigned to for packet processing . In other words, the identifier vector space is split into subspaces and each packet processing unit processes the requests for the identifier vector belonging to a particular subspace, whereby the identifier vector, for example, consists of the destination addresses. In a preferred embodiment the resulting split of the identifier vector space is exploited by the processor as it adjusts its processing method adaptively to the created traffic locality. Thus, a significant reduction in the number of memory accesses and, consequently, a speedup in the packet processing can be achieved. In other words, the packet processing units PPU 11 to PPU M exploit the knowledge of the method of determining the particular packet processing unit PPU 11 to PPU M for processing the data packet in order to advantageously adjust their packet processing methods to take advantage of the said knowledge.

By using known methods from the fields of hashing and distributed caching, it is possible to provide a fully distributed scheme, i.e., all the assignment decisions can be purely deterministic and require only a few basic operations which can be computed at run-time. At the same time, these methods provide load balancing over all available packet processing units PPU 11 to PPU M. This can be achieved as described in the following.

A function f1 (identifier vector) maps entries from the identifier vector space to the appropriate packet processing unit PPU 11 to PPU M. In order to take into account differences in the performance of each packet processing unit or unequal load distribution a partitioning vector p=(p1, p2, p3, . . . , pM) is advantageously introduced. The partitioning vector p defines a size of a fraction of the identifier vector space assigned to each packet processing units PPU 11 to PPU M.

Based on the partitioning vector p, a weights vector x is computed, which is then used in an extended function f2 (identifier vector, x). The weights vector x is stored in each line card LC 11 to LC N for computing the function f2 (identifier vector, x). The function f2 (identifier vector, x) computes the index of the packet processing unit PPU to be utilized for a specific data packet as a function of the identifier vector and the weights vector x.

The splitting of the identifier vector space is advantageously performed by a method being an adaptation of a method called Highest Random Weight method (HRW) that is described in D. G. Thaler, C. V. Ravishankar—"Using Name Based Mappings to Increase Hit Rates", IEEE/ACM Transactions on Networking, Vol. 6, No. 1, February 1998 or K. Ross—"Hash-Routing for Collections of Shared Web Caches", IEEE Network, Vol. 11, No. 6, November–December 1997.

The split of the identifier vector space is determined by assigning to each packet processing unit PPU 11 to PPU M a numerical quantity. Whereby, the numerical quantity results of a multiplication of a pseudorandom function rand( ) and a weights factor xj, xi taken from the weights vector x. Parameters of the pseudorandom function rand( ) are identifiers i, j indicating a particular packet processing unit, and the identifier vector of the packet to be processed. Furthermore, the result of the pseudorandom function rand( ) is multiplied with the according element xj or xi of the weights vector x, respectively. Then, the packet processing unit is selected which has the highest numerical quantity assigned to it.

> f2(identifier vector, x)=j<=>xj . rand(identifier vector, j)=max xi . rand(identifier vector, i) over all packet processing units i This scheme is fully distributed, has low overhead and provides load balancing and minimal disruption in case of remapping, when one or more packet processing units PPU 11 to PPU M fail and the workload has to be reassigned to the remaining ones. This function also takes into account different processing capacities of the packet processing units represented by the weights vector x.

This scheme can also be coupled with the Fibonacci hashing scrambling method, which leads to uniformly distributed sequences, such a mapping scheme can very simply be implemented. The Fibonacci hashing method is descibed, e.g., in D. E. Knuth "The Art of Computer Programming, Vol. 3, Sorting and Searching", Addison—Wesley, 1973.

After determining one of the packet processing units PPU 11 to PPU M in one of the aforementioned ways a request is sent to the appropriate packet processing unit PPU 13, as indicated by arrow 122 in FIG. 1. The request includes sending the relevant fields of the packet to the determined packet processing unit PPU 13.

In the following, the packet processing unit PPU 13 processes the received relevant packet fields . As a result, the packet processing unit PPU 13 returns an identification of the determined output port to forward the data packet 112 to, indicated by arrow 124. That is, the packet processing unit PPU 13 returns in the example shown in FIG. 1 the identification LC 14, which means that the data packet 112 needs to be forwarded to line card LC 14.

Other information about the desired packet treatment and alterations, based on the packet processing, may also be sent back to the requesting unit. That information includes, for example, a decision on specific QoS (Quality of Service) treatment of the packet, its mapping onto an MPLS (Multiprotocol Label Switching) label, discarding it or sending it to a control point in case of filtering or splicing with another TCP (Transmission Control Protocol) connection in case of load balancing.

In the next step the line card LC 12 resumes the previously stored packet , applies the desired treatment and alterations to the packet and forwards the data packet 112 to the indicated output, here line card LC 14, denoted by arrow 126. From line card LC 14 the data packet 112 gets fed into the transmission facility connected to the output 114 of line card LC 14 for further transmission as indicated by arrow 128.

Figure 2:
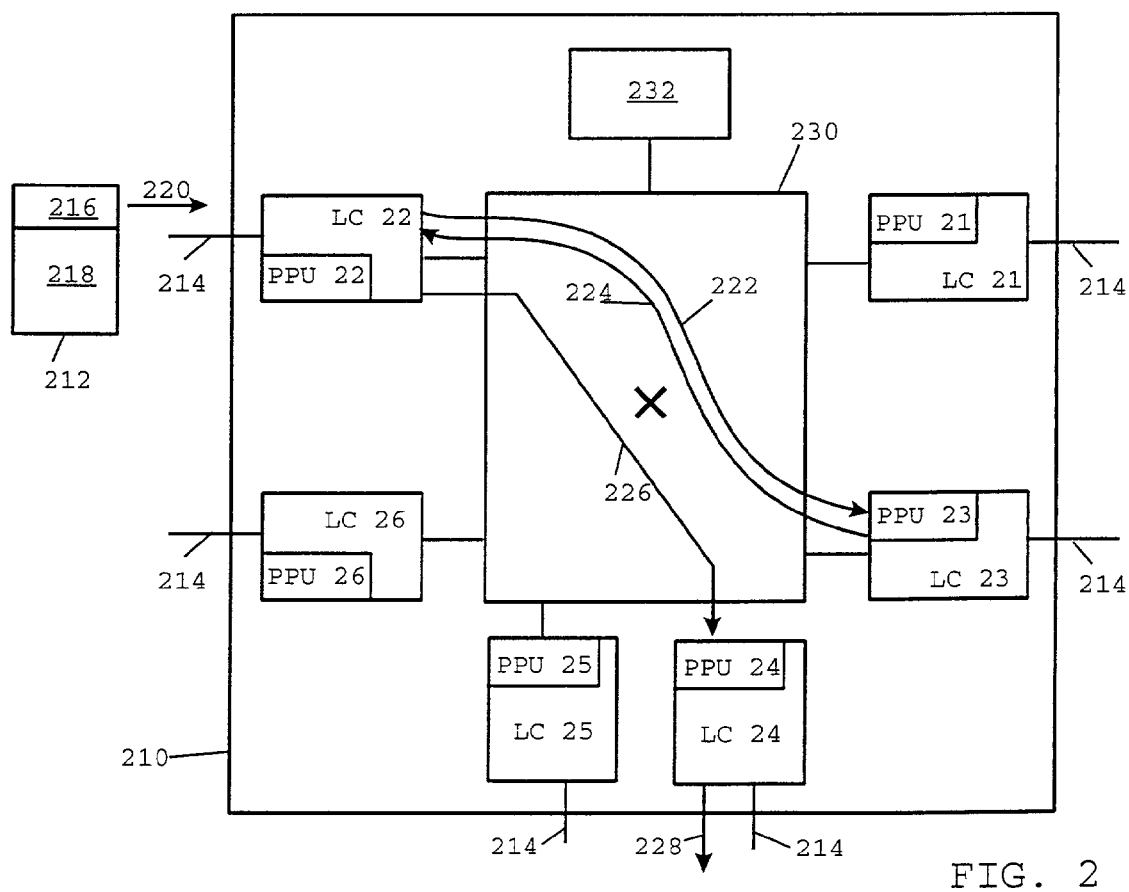
FIG. 2 is a high-level block diagram illustrating a preferred embodiment of a router being implemented in accordance with the present invention.

FIG. 2 is a high-level block diagram illustrating a preferred embodiment of a router 210 in accordance to the present invention. In FIG. 2, most of the parts shown have equivalents in FIG. 1. Furthermore, the sequence of operation described with reference to FIG. 1 also applies for the embodiment depicted in FIG. 2.

The router 210 comprises a plurality of input/output line cards LC 21 to LC 26, a switching unit 230 and a control unit 232. Each line card LC 21 to LC 26 comprises an input/output port 214 and one packet processing unit PPU 21 to PPU 26, whereby packet processing unit PPU 21 is situated in line card LC 21, packet processing unit PPU 22 is situated in line card LC 22 and so on. Hence, the line cards LC 21 to LC 26 do not only distribute the workload among all other packet processing units PPU 21 to PPU 226, but also among themselves, i.e., in the scheme according to the present invention the packet processing units PPU 21 to PPU 26 are both the requesting units and the processing units.

According to another embodiment in accordance to the present invention the packet processing units PPU 21 to PPU 26 are situated locally at the input ports 214 as part of the line cards LC 21 to LC 26. However, all packet processing units PPU 21 to PPU 26 are still treated as a pool of parallel processing units accessed through the switching unit 230.

In response to a data packet 212 arriving at the input port 214 of line card LC 22 (cf. arrow 220) packet processing unit PPU 23 of line card LC 23 is determined. Again, the data packet 212 consists of a header portion 216 and a data portion 218. As indicated with arrow 222, the packet processing unit PPU 23 of line card LC 23 is than requested to derive a respective output port to forward the data packet 212 to, whereby the respective output port is derived from the piece of packet information, for example, the destination address, associated to the data packet 212. In the following indicated by arrow 224, an identification "LC 24" identifying the respective output port 214 of line card LC 24 is returned to the requesting unit, here line card LC 22. Finally, as indicated by arrow 226, the data packet 212 is forwarded through the switching unit 230 to the identified line card LC 24 and further to the connected output 214 into the next network (cf. arrow 228).

Hence, the mapping is performed purely locally at each input, has little overhead and provides load balancing. At the same time, the line cards or the switch according to the present invention can handle uneven loads as well as bursts of loads at various inputs by distributing the processing task to multiple processing units, here the packet processing units PPU 21 to PPU 26. In effect, the method and system provided here in accordance to the present invention provides a kind of statistical multiplexing of traffic among multiple processing units. Effectively, the router according to the present invention can be called a distributed router which functions as a parallel packet processing computer.

Figure 3:
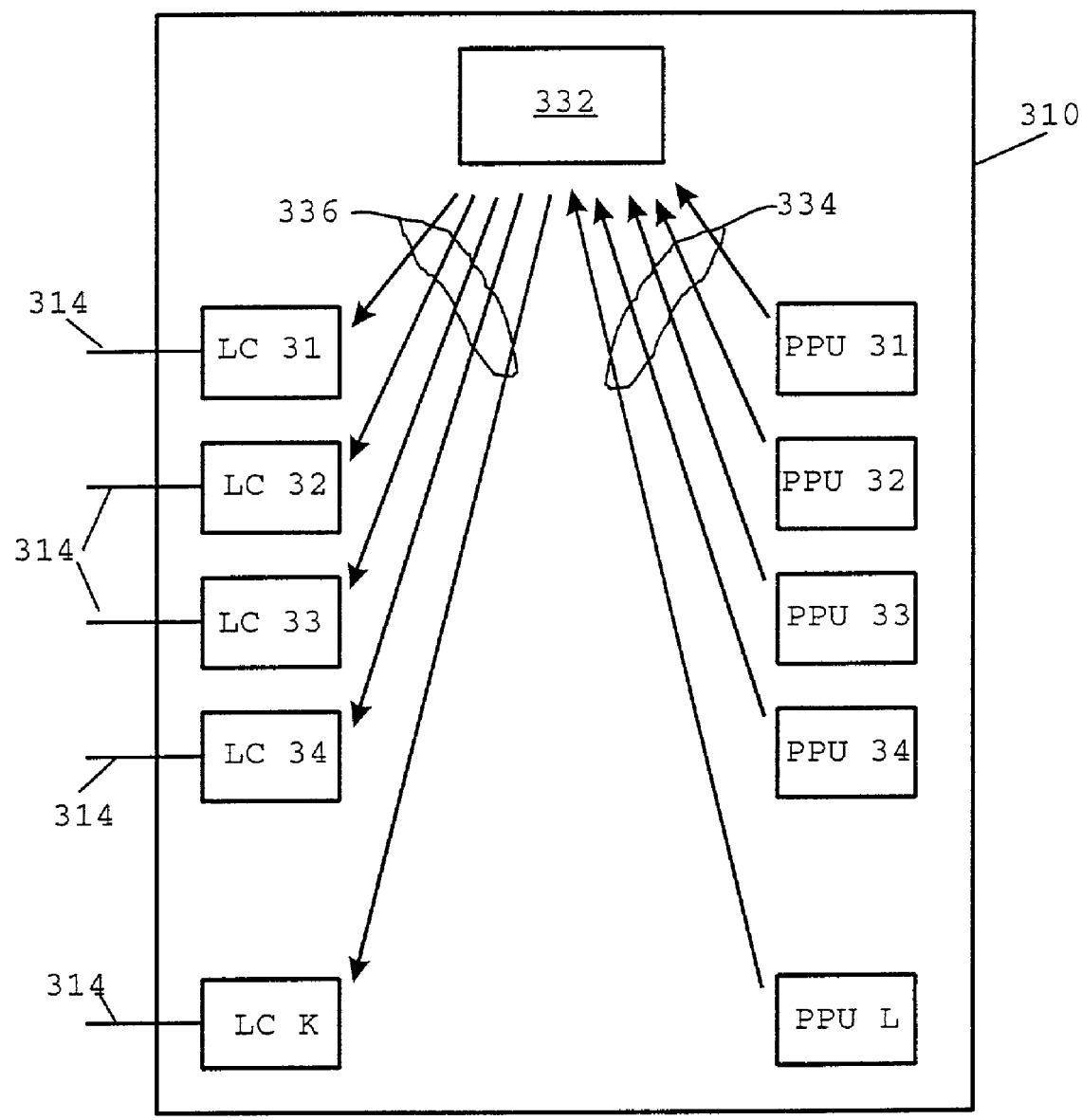
FIG. 3 is a high-level block diagram illustrating load balancing and feedback in router being implemented in accordance with the present invention.

FIG. 3 is a high-level block diagram illustrating load balancing and feedback in router 310 implemented in accordance with the present invention. Most parts shown in FIG. 3 have equivalents in FIGS. 1 and 2.

The router 310 comprises a plurality of input/output line cards LC 31 to LC K, a plurality of packet processing units PPU 31 to PPU L, a plurality of input/output ports 314 and a control unit 332. For the sake of clarity, the packet processing units are drawn separate from the line cards as in FIG. 1. However, the packet processing units PPU 31 to PPU L can as well be part of the line cards LC 31 to LC K situated directly at the input ports 314 of the router 310, as shown in FIG. 2.

To account for various processing capacities of the packet processing units PPU 31 to PPU L, the control unit 332 may compute the partitioning vector p=(p1, p2, p3, ..., pM). The partitioning vector p defines a size of a fraction of the identifier vector space assigned to each packet processing unit PPU 11 to PPU M. The partitioning vector p is then used to compute a weights vector v (cf. above, description to FIG. 1) that is used to distribute the load evenly over all packet processing units PPU 31 to PPU L. The partitioning vector p or the weights vector x is uploaded to all the line cards LC 31 to LC K as indicated by arrows 336.

As indicated by arrows 334 each packet processing unit PPU 31 to PPU L periodically informs the control unit 332 of its packet processing load, i.e., the number of packets to be processed in an instant of time. The control unit 332 creates from the provided information a load balance vector r=(r1, r2, r3, ..., rL). In case that the imbalance among the processing units exceeds a certain limit (threshold), the control unit 332 computes a new partitioning vector p'=(p1', p2', p3' ... pL') as a function p'=g(r, p) of the previous partitioning vector p and the load balance vector r. Accordingly, a new weights vector x is calculated as well. Finally, the new partitioning vector p' or the new weights vector x is uploaded to all the line cards LC 31 to LC K as indicated by arrows 336.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

What is claimed is:

1. A method for processing data packets (112) in a router (110) having a plurality of input ports (114), a plurality of output ports (114) and more than one packet processing unit (PPU 11 to PPU M) for deriving from a piece of information associated to each data packet (112) one of said plurality of output ports (114) to forward said data packet (112) to, said method comprising the steps:

determining one packet processing unit (PPU 11 to PPU M) of said more than one packet processing unit (PPU 11 to PPU M) in response to an appearance of a data packet (112) at one of said input ports (114), wherein said determining one packet processing unit is based on a split of an identifier vector space formed by the complete range of identifier vectors consisting of a set of fields included in the said data packets (112);

requesting from said determined packet processing unit (PPU 11 to PPU M) an identification of a respective output port (114) derived from a piece of packet information indicating where to forward said data packet (112) to; and forwarding said data packet (112) to said identified output port (114), wherein the split of the identifier vector space is determined by assigning to each packet processing unit (PPU 11 to PPU M) a numerical quantity resulting of a pseudorandom function (rand) of an identifier indicating said particular packet processing unit (PPU 11 to PPU M) and a piece of information (identifier vector) associated to the data packet (112) to be processed and selecting said packet processing unit (PPU 11 to PPU M) having the highest numerical quantity assigned.

2. The method according to claim 1, wherein said identified packet processing unit of said more than one packet processing unit (PPU 11 to PPU M) derives from said piece of information associated to each data packet additional information about a desired packet treatment and alterations to be applied to the data packet (112), said requesting from said determined packet processing unit (PPU 11 to PPU M) includes a request for an identification of what desired treatment and what alterations are to be applied to the data packet (112), and said method further comprises a step of applying said desired treatment and said alterations to the data packet (112).

3. The method according to claim 1, wherein said piece of information includes a destination address associated to each data packet (112).

4. The method according to claim 1, wherein determining one packet processing unit (PPU 11 to PPU M) is additionally based on information about the workload of every single packet processing unit (PPU 11 to PPU M), whereby said information about the workload is periodically provided to be utilized for determining one packet processing unit (PPU 11 to PPU M).

5. The method according to claim 1, wherein the packet processing units (PPU 11 to PPU M) exploit the knowledge of the method of determining the particular packet processing unit (PPU 11 to PPU M) for processing the data packet in order to advantageously adjust their packet processing methods to take advantage of the said knowledge.

6. A computer program product stored on a computer usable medium, comprising computer readable program means for causing a computer to perform a method according to claim 1.

7. A system (LC 1 to LC N) for processing data packets (112) in a router (110) having a plurality of input ports (114), a plurality of output ports (114) and more than one packet processing unit (PPU 11 to PPU M) for deriving from a piece of information associated to each data packet (112) one of said plurality of output ports (114) to forward said data packet (112) to, said system comprising:

means for determining one packet processing unit (PPU 11 to PPU M) of said more than one packet processing unit (PPU 11 to PPU M) in response to an appearance of a data packet (112) at one of said input ports, means for requesting from said determined packet processing unit (PPU 11 to PPU M) an identification of a respective output port (114) derived from a piece of information indicating where to forward said data packet (112) to; and means for forwarding said data packet (112) to said identified output port (114), whereby said system (LC 1 to LC N) determines one packet processing unit of said more than one packet processing unit (PPU 11 to PPU M) based on a split of an identifier vector space formed by the complete range of identifier vectors consisting of a set of fields included in the said data packets, wherein the split of the identifier vector space is determined by assigning to each packet processing unit (PPU 11 to PPU M) a numerical quantity resulting of a pseudorandom function (rand) of an identifier indicating said particular packet processing unit (PPU 11 to PPU M) and a piece of information (identifier vector) associated to the data packet (112) to be processed and selecting said packet processing unit (PPU 11 to PPU M) having the highest numerical quantity assigned.

8. The system according to claim 7, whereby said identified packet processing unit of said more than one packet processing unit (PPU 11 to PPU M) derives from said piece of information associated to each data packet additional information about a desired packet treatment and alterations to be applied to the data packet (112), said means for requesting from said determined packet processing unit (PPU 11 to PPU M) are thus prepared to request an identification of what desired treatment and what alterations are to be applied to the data packet (112), and said system further comprises means for applying said desired treatment and said alterations to the data packet (112).

9. The system according to claim 7, wherein the piece of information includes the destination address associated to each data packet (112).

10. The system according to claim 7, whereby said system (LC 1 to LC N) is situated at an input port (114).

11. A router (110) having a plurality of input ports (114), a plurality of output ports (114) and more than one packet processing unit (PPU 11 to PPU M) for deriving from a piece of information associated to each data packet (112) one of said plurality of output ports (114) to forward said data packet (112) to, characterized by a system (LC 1 to LC N) for processing data packets (112) according to claim 7.

* * * * *